(12) United States Patent
Buhl et al.

(10) Patent No.: US 12,504,315 B2
(45) Date of Patent: Dec. 23, 2025

(54) RETAIL WEIGHING SCALE

(71) Applicant: Bizerba SE & Co. KG, Balingen (DE)

(72) Inventors: Steffen Buhl, Winterlingen (DE); Steffen Keinath, Burladingen (DE)

(73) Assignee: BIZERBA SE & CO. KG, Balingen (DE)

( * ) Notice: Subject to any disclaimer, the term of this patent is extended or adjusted under 35 U.S.C. 154(b) by 381 days.

(21) Appl. No.: 18/068,541

(22) Filed: Dec. 20, 2022

(65) Prior Publication Data
US 2023/0213373 A1 Jul. 6, 2023

(30) Foreign Application Priority Data
Dec. 31, 2021 (EP) .................................... 21218510

(51) Int. Cl.
| | |
|---|---|
| *G01G 21/22* | (2006.01) |
| *B41J 11/00* | (2006.01) |
| *B41J 11/64* | (2006.01) |
| *G01G 21/28* | (2006.01) |
| *G01G 23/00* | (2006.01) |
| *G01G 23/01* | (2006.01) |
| *G01G 23/42* | (2006.01) |
| *H05B 45/335* | (2020.01) |
| *H10H 29/14* | (2025.01) |

(52) U.S. Cl.
CPC ............ *G01G 21/22* (2013.01); *B41J 11/007* (2013.01); *B41J 11/64* (2013.01); *G01G 21/28* (2013.01); *G01G 23/005* (2013.01); *G01G 23/012* (2013.01); *G01G 23/42* (2013.01); *H05B 45/335* (2020.01); *H10H 29/14* (2025.01); *B41J 2203/011* (2020.08)

(58) Field of Classification Search
CPC ........ G01G 21/22; G01G 21/28; G01G 23/00; G01G 23/005; G01G 23/42
See application file for complete search history.

(56) References Cited

U.S. PATENT DOCUMENTS

| | | | |
|---|---|---|---|
| 7,163,311 B2 * | 1/2007 | Kramer | G09B 19/0092 220/574.3 |
| 9,091,587 B2 * | 7/2015 | Kawamura | G01G 21/28 |
| (Continued) | | | |

FOREIGN PATENT DOCUMENTS

| | | |
|---|---|---|
| DE | 102009049567 A1 | 4/2011 |
| DE | 202011050040 U1 | 7/2011 |
| DE | 102011083562 A1 | 3/2013 |

*Primary Examiner* — Natalie Huls
(74) *Attorney, Agent, or Firm* — LEYDIG, VOIT & MAYER, LTD.

(57) ABSTRACT

A weighing scale has a housing accommodating a load cell, having fixed, deformation, movable portions. The fixed portion is connected to the housing, and the movable portion bears a spider having a platter. The deformation portion has a strain gauge measuring a weight acting on the platter. A strip light is attached to an external wall of the housing. A state machine of a controller depicts states of the weighing scale. The controller either: applies a voltage to the strip light in a pulsed manner when the state machine is in a first state, and applies a voltage to the strip light constantly in a second state; or applies a voltage to a third group of LED lamps of the strip light constantly in the first state, and applies a voltage to a second group of LED lamps of the strip light constantly in the second state.

17 Claims, 4 Drawing Sheets

(56) References Cited

U.S. PATENT DOCUMENTS

| | | | | |
|---|---|---|---|---|
| 11,853,992 B2* | 12/2023 | Kawaguchi | ............ | G07G 1/0054 |
| 2007/0186515 A1* | 8/2007 | Ruetten | ................ | G07G 1/0072 |
| | | | | 211/85.15 |
| 2016/0356640 A1* | 12/2016 | Freeman | ............... | G08B 21/182 |
| 2017/0123199 A1* | 5/2017 | Jones | ....................... | F21V 23/06 |
| 2017/0188951 A1* | 7/2017 | Banet | .................... | A61B 5/0261 |
| 2019/0204195 A1* | 7/2019 | Staub | ........................ | G01B 5/28 |
| 2021/0186241 A1* | 6/2021 | Kramer | .............. | G01G 19/4146 |
| 2021/0262851 A1* | 8/2021 | Blankley, Jr. | ....... | G06Q 30/0641 |

* cited by examiner

RETAIL WEIGHING SCALE

CROSS REFERENCE TO RELATED APPLICATIONS

This application claims benefit to European Patent Application No. EP 21218510.2, filed on Dec. 31, 2021, which is hereby incorporated by reference herein.

FIELD

The present disclosure relates to a weighing scale, in particular to a retail weighing scale, comprising a weighing module.

BACKGROUND

Weighing scales generally comprise an operator display for interacting with the weighing scale, for example for displaying a weight or for displaying malfunctions. In the process, operators have to navigate through various menu levels to obtain specific information about the state of the weighing scale. This is often complex and unintuitive for operators.

SUMMARY

In an embodiment, the present disclosure provides a weighing scale that has a weighing module, which includes a housing in which a load cell is accommodated, the load cell having a fixed portion, a deformation portion, and a movable portion. The fixed portion is connected to the housing, and the movable portion bears a spider having a platter. The deformation portion has a strain gauge for measuring a weight acting on the platter. A strip light is attached to an external wall of the housing substantially all around the housing. The weighing scale also has controller that has a state machine, which is configured to depict at least one technical state of the weighing scale. The controller is configured to actuate the strip light on the basis of a state of the state machine. The controller is further configured to: apply a voltage to the strip light in a pulsed manner in a condition where the state machine is in a first state, and apply a voltage to the strip light constantly in a condition where the state machine is in a second state; or apply a voltage to a third group of LED lamps of the strip light constantly in the condition where the state machine is in the first state, and apply a voltage to a second group of LED lamps of the strip light constantly in the condition where the state machine is in the second state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present disclosure creates a simple device that informs operators of the technical state of the weighing scale and makes it simpler for them to interact with the weighing scale.

According to an aspect of the present disclosure, a weighing scale, in particular a retail weighing scale, is provided. The weighing scale comprises a weighing module. The weighing module comprises a housing in which a load cell is accommodated. The load cell comprises a fixed portion, a deformation portion, and a movable portion. The fixed portion is connected to the housing. The movable portion bears a spider comprising a platter. The deformation portion has a strain gauge for measuring a weight acting on the platter. A strip light is attached to the external wall of the housing substantially all around the housing. In this context, "substantially all around" means that the strip light extends around three sides and a significant part of the fourth side of the housing but the start and end of the strip light need not be connected or meet. Thus, it also means that there is a gap between the start and end of the strip light on the side on which the start and end extend toward each other. The weighing scale comprises a control unit comprising a state machine, which depicts at least one technical state of the weighing scale, the control unit actuating the strip light on the basis of the state of the state machine. In a first embodiment, the control unit applies a voltage to the strip light in a pulsed manner when the state machine is in a first state. In other words, the voltage is switched on and off in a regular manner. This results in the strip light flashing. In the process, the frequency and length of the voltage pulses are to be selected such that the human eye perceives the strip light to be flashing. When the state machine is in a second state, the control unit applies a voltage to the strip light constantly. In other words, the strip light is permanently lit up. In a second embodiment, the control unit applies a voltage to a third group of LED lamps of the strip light constantly when the state machine is in a first state. The control unit applies a voltage to a second group of LED lamps of the strip light constantly when the state machine is in a second state.

In one embodiment, the strip light comprises first, second, and third LED lamps. The first LED lamps generate light in a wavelength range from 450 nm to 500 nm, corresponding to the color blue. The second LED lamps generate light in a wavelength range from 500 nm to 570 nm, corresponding to the color green. The third LED lamps generate light in a wavelength range from 610 nm to 760 nm, corresponding to the color red. In one embodiment, the strip light consists of a flexible substrate. The LED lamps are arranged on the flexible substrate. In one embodiment, the substrate comprises one to ten LED lamps per cm of length. The first, second, and third LED lamps are arranged in regular arrangements on the substrate. The first LED lamps form a first group of LED lamps. The second LED lamps form a second group of LED lamps. The third LED lamps form a third group of LED lamps. The LED lamps of each particular group are actuated jointly by the control unit. In one embodiment, the strip light is coated with silicone on the side on which the LED lamps are attached. Silicone is light-transmitting. At the same time, a diffuse effect is produced such that the light from the individual LED lamps is somewhat scattered. Superposed colors thus result from the three groups of LED lamps, which can be perceived by the human eye as blue, green, and red, and so almost the entire RGB color space is available.

The human eye thus perceives the strip light as lit up in red when the state machine is in a first state and the control apparatus is applying voltage to the third group of LED lamps. The human eye perceives the strip light as lit up in green when the state machine is in the second state and the control apparatus is applying voltage to the second group of LED lamps.

In one embodiment, the technical state depicted by the state machine is a paper supply in a printer.

In one embodiment, the technical state depicted by the state machine is a difference from a target weight, which difference is established from the weight ascertained by the load cell and the target weight. In one embodiment, the technical state depicted by the state machine is outdated software that has to be updated with updates. In one embodiment, the technical state depicted by the state machine is a rate of various weight detection steps or of processing steps input via an operator display. In one embodiment, the technical state depicted by the state machine is that an operator has correctly verified their identity on the weighing scale via the operator display.

In one embodiment, the housing is formed as a single piece and in a trough shape. A person skilled in the art construes a housing formed as a single piece and in a trough shape to mean a shape of a housing that resembles a trough. It has a square or rectangular footprint, it being possible for the corners to be rounded. The housing has a main body which, in one embodiment, is made of a cast metal and may thus also have complex shapes, in particular openings and internal walls. The length and width of the housing are substantially greater than the height thereof. The housing comprises a base plate having side walls that are formed in one piece on the base plate. The housing is open at the top and has a clearance in the interior for receiving various modules, such as the load cell, electronic modules, and the like, in the interior of the housing. In one embodiment, the internal region of the housing is covered on top by a cover. The expression 'as a single piece and in a trough shape' also includes a housing that has partitions for various spaces or stability struts in the interior. In addition, it also includes a housing of which the base plate is stepped at some points such as to produce a clearance at said points of the housing underneath the base plate of the housing when the main body is set down on a flat surface. This clearance is used, for example, for attaching connectors underneath the housing. The housing should be construed as being a single piece and in a trough shape even when through-openings are present at various points in the in particular stepped base plate or side walls, for example for attaching plug sockets, leading through cables, or fitting supports and other elements of the weighing scale. The term "in a trough shape" should therefore be taken to be merely descriptive of the basic appearance of the housing.

In one embodiment, the state machine is a finite-state machine consisting of states, state changes, and actions.

In one embodiment, the control unit comprises a memory in which a target weight is stored. The state machine is in the second state when the weight value measured by the load cell matches the target weight. The state machine is in the first state when the weight value measured by the load cell differs from the target weight. In this case, the target weight should not be construed as discrete weight information. Rather, the target weight is a weight range, i.e., discrete weight information having a particular tolerance, for example 5% or 10%. For instance, when using the weighing scale in the food sector the target weight is, for example, 190 g to 210 g. If the weight value measured by the load cell is within this range, it matches the target weight and the state machine is in a second state. If the weight value measured by the load cell is outside this range, for example 180 g, the weight value measured by the load cell differs from the target weight and the state machine is in the first state. The skilled person thus construes the term "target weight" as information about a weight range, the breadth of the weight range being small in comparison with the absolute weight value. In this way, operators can interact with the weighing scale if the strip light indicates to them that they have to place more products, for example slices of foodstuffs, on the platter of the weighing scale in order to reach a target weight, or the weighing scale signals that the target weight has been reached using the strip light. The weighing scale thus guides how operators interact with the weighing scale.

In one embodiment, a target number of items and an average weight per item are stored in a memory in the control unit. The control unit ascertains a target weight by multiplying the target number of items by the average weight per item. The weight value measured by the load cell is then compared with the target weight. If articles having the specific weight are placed on the weighing scale in a quantity matching the target number of items, the target weight is reached and measured by the load cell. In this case, the state machine is in the second state. If there are more or fewer items on the weighing scale than the target number of a product having a corresponding weight, the weight is above or below the accordingly calculated target weight. The weight value measured by the load cell differs from the target weight that the state machine is in the first state. Accordingly, the strip light is actuated by the control unit. In this way, the weighing scale signals to the user whether the desired quantity of a product has been counted. In this way, operators can interact with the weighing scale when the strip light indicates to them that they have to place more products, for example general goods, on the platter of the weighing scale in order to reach a target number of items, or the weighing scale signals that the target number of items has been reached using the strip light. The weighing scale thus guides how operators interact with the weighing scale.

In one embodiment, both the target weight and the number of items and the specific weight of a product to be weighed are input by the operator using a computer unit on the weighing scale. By way of example, the computer unit is an all-in-one PC used as a touchscreen for operating the weighing scale. However, the specific way in which these data are made available to the control unit is immaterial for the invention.

In one embodiment, the weighing scale comprises a printer. The printer unrolls paper, in particular direct thermal paper, from a continuous reel using a motor-driven printing roller and feeds it to a print head for direct thermal printing. The printer comprises a sensor, which determines the length of paper consumed. In one embodiment, the control system of the printing roller ascertains the length of paper consumed, since the number of revolutions of the printing roller can be ascertained in the control system and the diameter of the printing roller is a known parameter. The control unit ascertains the difference from the paper length originally present on the continuous reel minus the length of paper consumed since the last paper reel change. This corresponds to the paper supply remaining on the continuous reel. The state machine remains in the second state as long as the difference is greater than a threshold value. In other words, if there is still paper on the reel, the state machine remains in the second state. The state machine switches to the first state when the difference drops below a threshold value. This threshold value indicates that the paper supply on the continuous reel is spent or almost spent and that the operator should insert a new paper reel. The state machine is then in the first state.

In one embodiment, the control unit comprises a receiver which is configured to receive data from a computer unit. The state machine of the control unit transitions from the second state to the first state when the receiver receives a signal from the computer unit indicating that a software update is required.

In one embodiment, the control unit comprises a receiver which is configured to receive data from a computer unit. The state machine of the control unit transitions from the second state to the first state when the receiver receives a signal from the computer unit indicating that an operator has logged into the computer unit using their operator ID for the purpose of serviced sales. The state machine of the control unit transitions from the first state to the second state when the receiver receives a signal from the computer unit indicating that an operator has logged out of the computer unit using their operator ID. By way of example, the computer unit is an all-in-one PC used as a touchscreen for operating the weighing scale. However, the specific way in which these data are made available to the control unit is immaterial for the invention.

In one embodiment, the state machine of the control unit changes from the second state to the first state when the weight value measured by the load cell shows that the load cell is overloaded. The operator can then immediately remove the product from the platter in order to prevent potential damage to the weighing scale, and in particular to the load cell.

In one embodiment, the state machine of the control unit is in the second state when the load cell performs a number of weighing operations per unit of time that is above a threshold value stored in the control unit. The state machine of the control unit is in a first state when the number of weighing operations performed by the load cell per unit of time is below the threshold value. The state machine thus monitors the rate at which an operator interacts with the weighing scale, in particular how many weighing operations an operator carries out per unit of time. A weighing operation is detected, for example, when the load cell measures a weight value and then the weight value reverts to the value zero or to the initial load of the platter and spider.

In one embodiment, the state machine is in the first state when the weight value measured by the load cell is below the target weight. The state machine is in a third state when the weight value measured by the load cell is above the target weight. The control unit applies a voltage to the strip light in a pulsed manner when the state machine is in a first state. In this case, the voltage pulses have a first frequency. The control unit applies a voltage to the strip light in a pulsed manner when the state machine is in a third state. In this case, the voltage pulses have a second frequency. The first frequency and second frequency are different. In one embodiment, the first frequency is lower than the second frequency. Consequently, the strip light flashes slowly if the target weight has not been reached. The strip light flashes quickly when the target weight is exceeded. The strip light is lit up constantly when the target weight is reached. In this way, the weighing scale enables the operator to have a guided human-machine interaction in that, on the basis of the actuation of the strip light by the control unit and the resulting quick or slow flashing, the operator can place more products, for example slices of cured meats, on the platter or remove products, for example slices of cured meats, from the platter until the difference value established in the control unit between the target weight and the measured weight value drops below a threshold value and the target weight is thus deemed to have been reached. As a result, the control unit switches into an operating mode in which the control unit applies a constant voltage to the strip light. The same applies to general goods if the operator has to separate, i.e., count, a certain number of products using the platter. In the event of a large quantity of desired products, for example 100 screws, a target weight is calculated in the control unit using the specific weight of one screw, and the weighing scale enables the operator to have a guided human-machine interaction in order to establish an amount from a quantity of a general good, for example 100 screws, on the platter.

In one embodiment, the state machine is in a first state when the weight value measured by the load cell is below the target weight. The state machine is in a third state when the weight value measured by the load cell is above the target weight. In one embodiment, the state machine is in a second state when the weight value measured by the load cell matches the target weight. The strip light comprises at least second and third LED lamps. The second LED lamps generate light in the wavelength range from 500 nm to 570 nm. This corresponds to green light. The third LED lamps generate light in the wavelength range from 610 nm to 760 nm. This corresponds to red light. The second and third LED lamps are arranged in regular arrangements on the strip light. The second and third LED lamps are actuated and subjected to voltage by the control unit jointly in respective groups. This should be taken to mean that all the second LED lamps are each switched on or off jointly. Likewise, all the third LED lamps are each switched on or off jointly. However, this does not rule out the possibility of the second LED lamps and the third LED lamps and/or further groups of LED lamps being actuated and switched on or off jointly. The control unit applies voltage to the second LED lamps of the strip light constantly when the state machine is in a second state. The strip light lights up in green. The control unit applies voltage to both the second and third LED lamps of the strip light constantly when the state machine is in a first state. The green and red LED lamps are switched on at the same time. The regular arrangement of the second LED lamps and the third LED lamps and the superposition of the light from the second LED lamps and from the third LED lamps produce yellow light as a result of additive color mixing. The control unit applies voltage to the third LED lamps of the strip light constantly when the state machine is in a third state. The strip light lights up in red. Consequently, the strip light lights up in yellow if the target weight has not been reached. The strip light lights up in red when the target weight is exceeded. The strip light lights up in green when the target weight is reached. In this way, the weighing scale enables the operator to have a guided human-machine interaction in that, on the basis of the actuation of the strip light by the control unit and the resulting yellow or red illumination of the strip light, the operator can place more products, for example slices of cured meats, on the platter or can remove products, for example slices of cured meats, from the platter until the difference value established in the control unit between the target weight and the measured weight value drops below a threshold value and the target weight is thus deemed to have been reached. As a result, the control unit switches into an operating mode in which the control unit applies a voltage only to the second lamps. The strip light then lights up in green. The same applies to general goods if the operator has to separate, i.e., count, a certain number of products using the platter. In the event of a large quantity of desired products, for example 100 screws, a target weight is calculated in the control unit using the specific weight of one screw, and the weighing scale enables the operator to have a guided human-machine interaction in order to establish an amount from a quantity of a general good, for example 100 screws, on the platter.

In one embodiment, the strip light extends around the housing once; in particular, the strip light extends around the housing once in the upper region of its side walls, it being possible for there to be a gap between the start and end of the strip light, which gap is small by comparison with the length of the strip light. In the process, the weighing scale comprises a platter positioned on the spider. In this case, the external edges of the platter lead over the spider and over the top rim of the housing so that the platter floats on the top side of the housing in the manner of a lid. In one embodiment, the strip light is located in the upper region of the side walls of the housing but underneath the edges of the platter. In one embodiment, the strip light is attached to the upper edge of the housing such as to be covered by the projecting edges of the platter. In this case, the light from the strip light diffusely shines out below the downwardly projecting edges of the platter.

In one embodiment, electrical lines for actuating the LED lamps are integrated in the flexible substrate material of the strip light.

In one embodiment, the LED lamps generate light in the wavelength range from 230 nm to 500 nm. The substrate, together with the LED lamps, is coated with phosphorus. In particular, the strip light is coated with phosphorus on the side on which the LED lamps are attached. Phosphorus converts the blue or ultraviolet light from the LED lamps into white light.

It should be noted in particular that each LED lamp is not or has not been coated with phosphorus individually and separately, but rather the LED lamps are first fitted on the substrate and then the whole side of the substrate is coated with phosphorus. The density of the LED lamps per unit of length of the strip light can thus be considerably increased, leading to a very homogeneous light effect. As a result, the illumination by the light from the LED lamps is additionally around 170° in relation to the plane of the strip light; in other words, the light can be perceived even from very acute angles.

In one embodiment, the flexible substrate has a layer of adhesive material on the opposite side from the LED lamps. In one embodiment, the layer is a layer of heat-conducting adhesive material. The strip light is attached, in particular glued, to the housing by the adhesive material. The heat produced by the LED lamps is dissipated to the housing by way of the layer of adhesive material, in particular by way of the heat-conducting adhesive material.

In the process, the adhesive material adheres on a surface of uncoated and/or coated cast metal, so the housing may be coated or uncoated at the point at which the strip light is glued.

In one embodiment, the strip light is electrically connected to the control unit. The strip light is actuated by the control unit using a DC voltage in the range from 6 V to 36 V, in particular 12 V or 24 V.

In one embodiment, the housing comprises a recess or a single-sided recess, which is made all around the outside of the housing in the upper housing region and into which the strip light is glued. A 'recess' in this case should be construed as an indentation in the housing wall, in the form of a groove. A 'single-sided recess' refers to an angle that is present, for example, in an obliquely extending housing wall. The angle forms an indentation, the back end of which for receiving the strip light is a vertical plane.

In one embodiment, the weighing scale comprises a diffuser, which is attached to the exterior of the housing and covers the recess. The diffuser ensures the light from the LED lamps is scattered such that they are no longer discernible as discrete light sources but rather it appears as though they are one elongate, homogeneous lamp. In addition, the diffuser ensures that the strip light has the same brightness from every viewing angle. The diffuser boosts the effect of the phosphorus or silicone.

In one embodiment, the diffuser consists of a translucent material. In one embodiment, the translucent material is a translucent polycarbonate.

In one embodiment, the diffuser comprises a structuring on its outside. The structuring makes the diffuser opaque when looking from the outside toward the housing. By contrast, the diffuser is translucent when looking from the housing side outward.

In one embodiment, the diffuser is formed as a ring. The ring has the dimensions of the housing in the region of the recess. The ring is form-fittingly attached to the housing by way of the recess. In particular, the ring is attached by a latching mechanism. In one embodiment, the diffuser covers the recess. In one embodiment, the diffuser is glued or screwed to the housing.

In one embodiment, the distance between the LED lamps and the inner side of the diffuser is less than 3 mm. In one embodiment, the distance between the LED lamps and the inner side of the diffuser is less than 1 mm.

Figure 1:
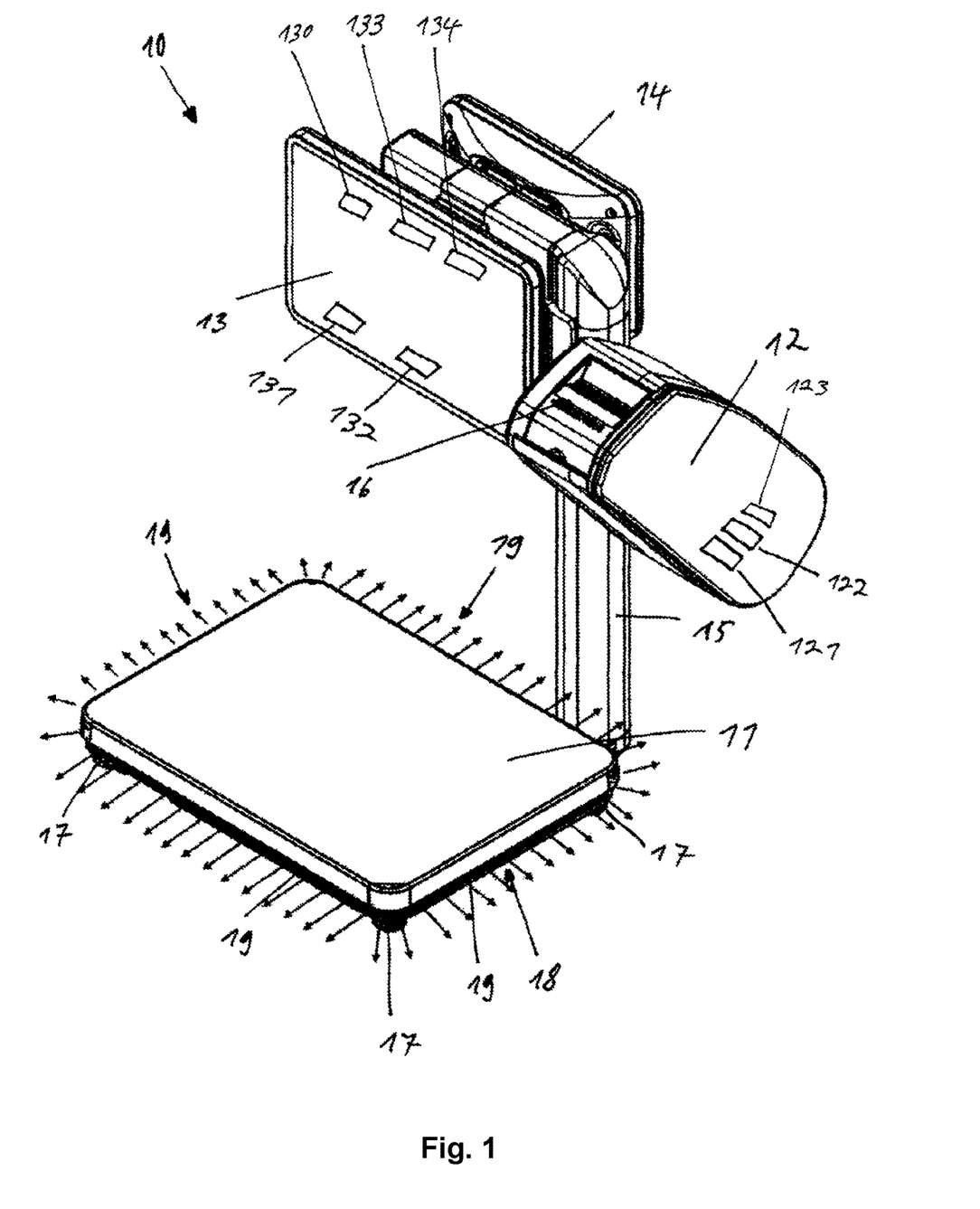
FIG. 1 shows a weighing scale according to an aspect of the present disclosure.

FIG. 1 shows a weighing scale 10 according to the present disclosure in accordance with a first embodiment. The weighing scale comprises a weighing module having a housing 18 in which a load cell is accommodated. The load cell bears a spider, which in turn bears a platter 11. The platter 11 has a downwardly projecting edge that protrudes over the upper rim of the housing 18. A stand 15 is fastened to the weighing module and bears a printer 12 having a label dispenser 16. The printer 12 has a transmitter 121, which relays the length of paper that is on a full paper reel. The printer 12 has a transmitter 123, which relays the current paper consumption, as determined by the rotation of a printing roller. The printer 12 has a transmitter 122, which sends out a reset signal when a new paper reel is inserted into the printer 12. The stand 15 further bears an operator display 13, which is formed as a touchscreen, and a customer display 14 on the opposite side from the operator display 13. The operator display 13 is an all-in-one PC and comprises a computer unit, which provides the computer-implemented functions 131 or operator inputs 130, 132, 133, 134 of the weighing scale. The weighing module rests on four feet 17 attached in its corners. A strip light 19 is attached all around the outer edge of the housing 18 and is actuated by a control unit depending on a technical state of the weighing scale.

Figure 2:
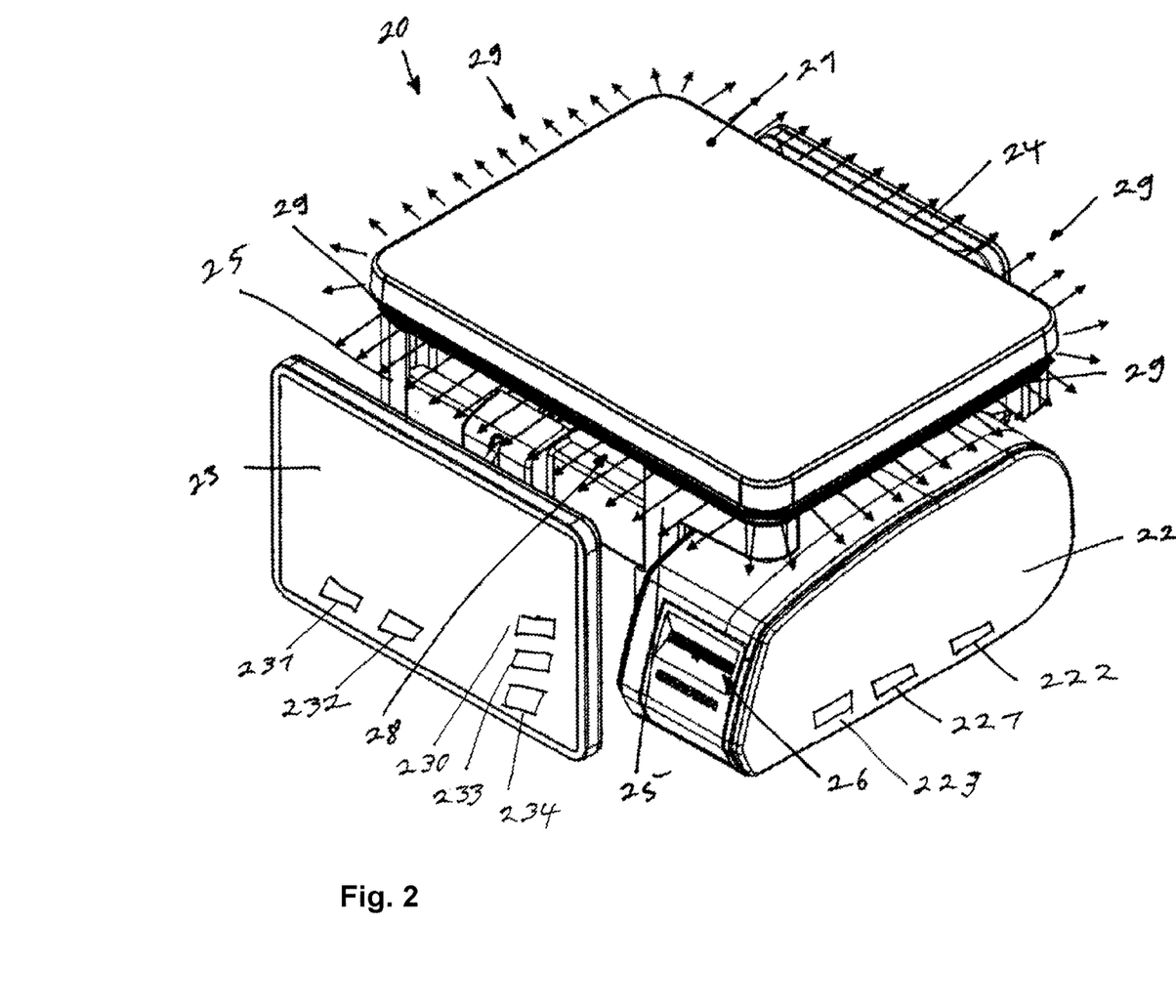
FIG. 2 shows a weighing scale according to an aspect of the present disclosure.

FIG. 2 shows a weighing scale 20 according to the present disclosure in accordance with a second embodiment. The weighing scale comprises a weighing module having a housing 28 in which a load cell is accommodated. The load cell bears a spider, which in turn bears a platter 21. The platter 21 has a downwardly projecting edge that protrudes over the upper rim of the housing 28. The weighing module rests on a frame 25, which bears a printer 22 having a label dispenser 26. The printer 22 has a transmitter 221, which relays the length of paper that is on a full paper reel. The printer 22 has a transmitter 223, which relays the current paper consumption, as determined by the rotation of a printing roller. The printer 22 has a transmitter 222, which sends out a reset signal when a new paper reel is inserted into the printer 22. The frame 25 further bears an operator display 23, which is formed as a touchscreen, and a customer display 24 on the opposite side from the operator display 23. The operator display 23 is an all-in-one PC and comprises a computer unit, which provides the computer-implemented functions 230 or operator inputs 230, 232, 233, 234 of the weighing scale. A strip light 29 is attached all around the outer edge of the housing 28 and is actuated by a control unit depending on a technical state of the weighing scale.

Figure 3:
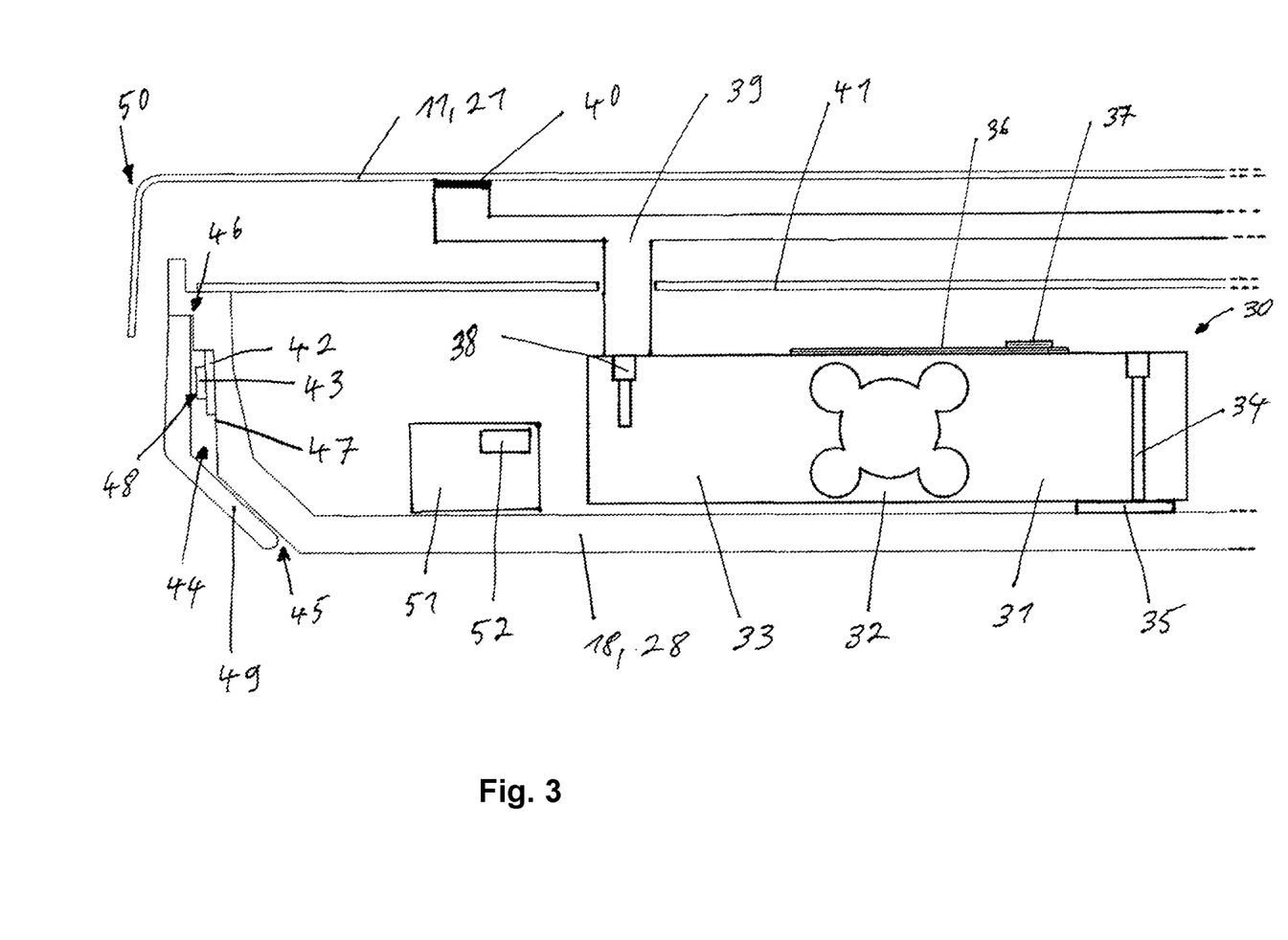
FIG. 3 shows a detail of a retail weighing scale according to an aspect of the present disclosure.

FIG. 3 is a section through the housing 18, 28 of a weighing scale 10, 20. The housing 18, 28 is a cast-metal housing and may be made in complex shapes. Inside the housing 18, 28, a load cell 30 is screwed on a plinth 35 by screws 34. The load cell 30 comprises a fixed portion 31 screwed to the housing 18, 28, a deformation portion 32, and a movable portion 33, to which a spider 39 is attached by a fastener 38. The spider 39 bears the platter 11, 21 of the weighing scale, rubber cushions 40 being attached between the spider 39 and platter 11, 21. At its edges, the platter 11, 21 comprises a bend 50 such that the platter 11, 21 protrudes downward at the sides over the upper edges of the housing 18, 28. The weight force of a product on the platter 11, 21 and also the weight force of the spider 39 and platter 11, 21 themselves thus act on the movable portion 33 of the load cell 30. This leads to a mechanical deformation of the deformation portion 32, and this is measured by means of the strain gauge 36 attached to the deformation portion 32. The measured deformation is determined by an evaluation unit 37 and converted into a weight value of the product. The interior of the housing 18, 28, in which the load cell 30 and also a control unit (controller) 51 and, where applicable, other components of the weighing scale, for example a power supply unit and the like, are located, is covered by a cover 41.

The housing 18, 28 consists of a base plate and four upwardly protruding side walls. The housing is made of cast metal and thus formed in one piece. The transition between the base plate and side walls is beveled. A recess 44 is made in the upper region of the side walls such that a vertical external wall 47 is slightly recessed at the side walls of the housing 18, 28. The substrate 42 of the strip light 19, 29 is glued fast to said vertical external wall 47. The substrate 42 is made of flexible material and can thus also be guided around the corners of the housing 18, 28 in the recess 44. In this context, 'flexible' means that the substrate 42 can be bent at least perpendicularly to the plane in which the substrate 42 extends but not necessarily also in the plane of the substrate 42 itself. LED lamps 43 are attached to the substrate 42. The LED lamps 43 may be attached in the longitudinal direction of the substrate 42 at a density of up to ten LED lamps 43 per cm. The substrate 42 and LED lamps 43 are covered, on the LED lamp side, with a protective layer 48 of silicone or phosphorus. In this case, the protective layer 48 is not merely attached to the LED lamps 43 themselves before they are fitted on the substrate 42, but rather it is attached over the substrate 42 and LED lamps 42 once the LED lamps 43 have been fitted on the substrate 42. In this way, a higher density of the LED lamps 43 on the substrate 42 can be achieved, and the beam angle for homogeneous light from each LED lamp 43 is increased to around 170°. A silicone protective layer 48 is applied when the LED lamps 43 generate light in the wavelength range from 450 nm to 500 nm, from 500 nm to 570 nm, and from 610 nm to 760 nm, respectively, and the various LED lamps 43 are arranged in regular arrangements on the substrate 42. As a result, the strip light 19, 29 can be made to light up in RGB colors by way of the control unit 51. A phosphorus protective layer 48 is applied when the LED lamps 43 emit light in the wavelength range from 230 nm to 500 nm (ultraviolet to blue light). Owing to the phosphorus protective layer 48, the operator perceives this light as white light.

The recess 44, together with the substrate 42, LED lamps 43, and protective layer 48, is covered by a diffuser 49. The diffuser 49 offers mechanical protection for the strip light 19, 29 while simultaneously refracting the light such that the strip light 19, 29 acts like a homogeneous light source. For this purpose, the diffuser 49 can be structured, i.e., surface-treated, on its external surface. The effect whereby the strip light 19, 29 acts as a homogeneous light source is brought about by the high density of LED lamps 43 and by the joint silicone or phosphorus protective layer 48 on the LED lamps 43 and is reinforced or rounded out by the diffuser 49 and the external structuring of the diffuser 49. The diffuser 49 abuts surfaces 45, 46 of the housing 18, 28 above and below the recess 44 and is glued to said surfaces 45, 46, latched thereto by a latching connection, or screwed thereto. The diffuser 49 is an annular component that is pushed over the housing 18, 28 from below and form-fittingly fits onto the side walls of the housing 18, 28. The diffuser 49 is made of translucent material, in particular of translucent polycarbonate.

The control unit 51 comprises a state machine 52, which depicts at least one technical state of the weighing scale. The control unit actuates the strip light 19, 29 on the basis of the state of the state machine 52.

The technical state depicted by the state machine may be a paper supply in a printer, a difference from a desired weight, which difference is established from the weight ascertained by the load cell and the desired weight, outdated software that has to be updated with updates, a rate of various weight detection steps or of processing steps input via an operator display, or the fact that an operator has correctly verified their identity on the weighing scale via the operator display. Depending on the state which the state machine is in on the basis of various input parameters from the load cell, sensors, or weighing scale control system, the strip light may, for example, be actuated in different colors (red, yellow, green) in the case of an RGB strip light, or in a lit-up or flashing manner in the case of a monochromatic strip light.

Figure 4:
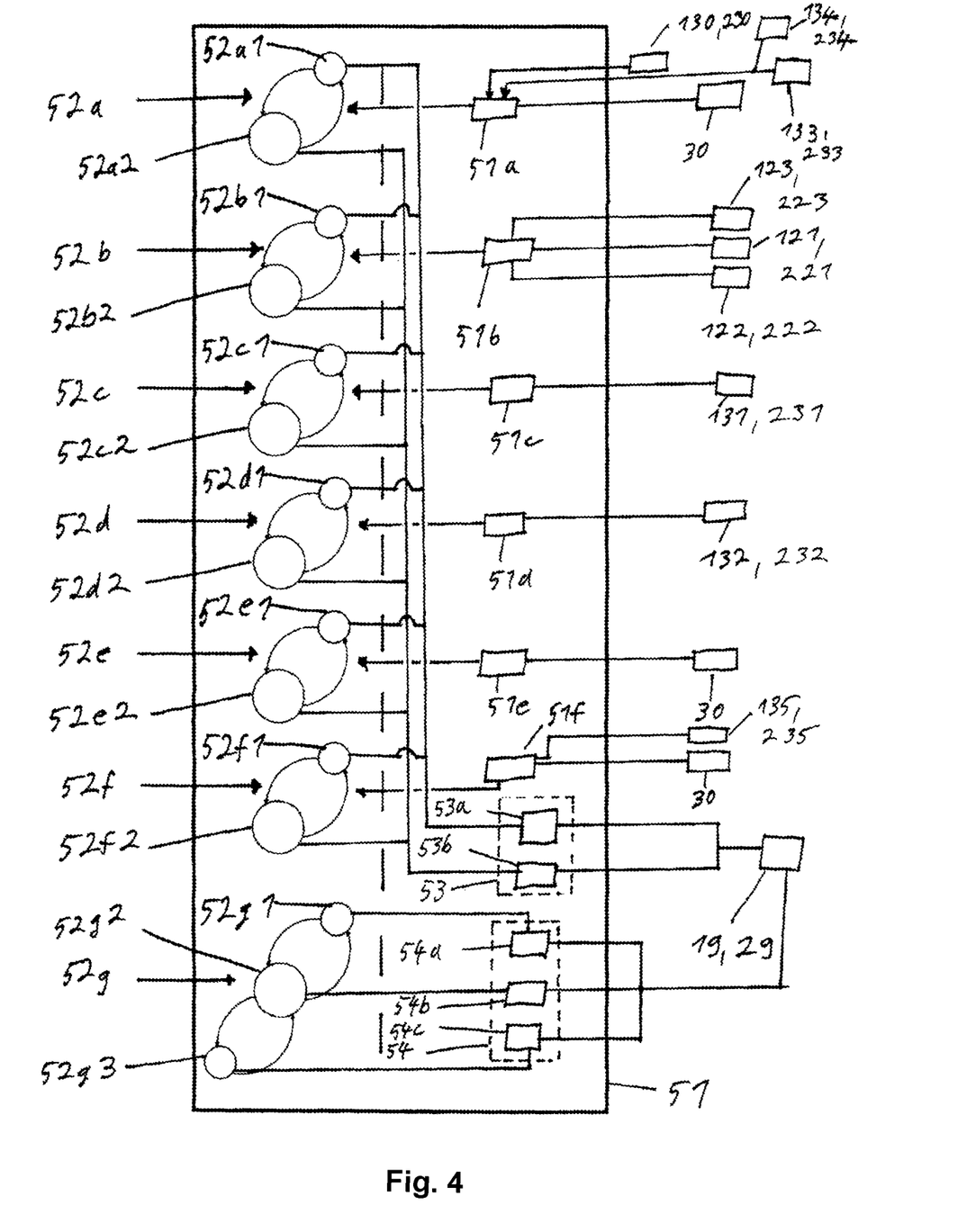
FIG. 4 is an illustration of the control unit comprising the state machine of the retail weighing scale.

FIG. 4 is a schematic illustration of the control unit 51 and the state machine 52 implemented in the control unit. In this case, FIG. 4 shows various state machines 52a, 52b, 52c, 52d, 52e, 52f, 52g, of which either all or only some may be implemented in a control unit 51 of a weighing scale 10, 20 according to the present disclosure. Each state machine 52a, 52b, 52c, 52d, 52e, 52f, 52g is assigned a control module 51a, 51b, 51c, 51d, 51e, 51f, which interacts with the corresponding state machine 52a, 52b, 52c, 52d, 52e, 52f, 52g and is part of the control unit 51.

The first control module 51a receives a target weight 130, 230 from an input apparatus of the weighing scale 10, 20, for example the operator display 13, 23. Alternatively, the first control module 51a receives a target number 134, 234 of products and a specific weight 133, 233 per product from an input device 13, 23 of the weighing scale 10, 20. The first control module 51a calculates a target weight from the target number of items 134, 234 and the specific weight 133, 233 per product. In the process, the first control module 51a may ascertain, from the target weight, a weight range including tolerances, in which case the overall weight range is deemed the target weight. In addition, the first control module 51*a* receives weight values ascertained by the load cell 30. If a weight value ascertained by the load cell 30 matches the target weight, the first state machine 52*a* switches to or remains in a second state 52*a*2. If the weight ascertained by the load cell 30 does not match the target weight, the first state machine 52*a* switches to or remains in the first state 52*a*1. The state changes between the first state 52*a*1 and the second state 52*a*2 are indicated in the figure.

From a printer 12, 22, the second control module 51*b* receives a paper length 121, 221 that is available on a continuous reel of direct thermal paper, and a reset signal 122, 222 indicating that a full reel of direct thermal paper has been newly inserted into the printer. From the printer 12, 22, the second control module 51*b* continuously receives information 123, 223 about how much paper is being fed to the print head using the motor-driven printing roller. This corresponds to the direct thermal paper consumed. The second control module 51*b* generates the difference from the paper length 121, 221 on the continuous reel and the consumed paper 123, 223. If this difference is lower than a threshold value, in particular is zero, i.e., the paper supply of the label reel is spent, then the second control module 51*b* switches the second state machine 52*b* to the first state 52*b*1. If this difference is greater than a threshold value, in particular is greater than zero, i.e., the paper on the continuous label reel is not yet spent, then the second state machine 52*b* remains in the second state 52*b*2. If a paper reel is refilled and the second control module 51*b* receives a corresponding reset signal 122, 222 from the printer 12, 22, the second control module 51*b* moves the second state machine 52*b* into the second state 52*b*2.

From a computer unit of the weighing scale 10, 20, which computer unit is integrated, for example, in the operator display 13, 23 of the weighing scale as an all-in-one computer, the third control module 51*c* receives a request 131, 231 to bring updates for the software up to date. The third control module 51*c* causes the third state machine 52*c* to transition to the first state 52*c*1. If the third control module 51*c* receives from the weighing scale 10, 20 that the updates have been installed, the third control module 51*c* causes the third state machine 52*c* to transition to the second state 52*c*2.

From a computer unit of the weighing scale 10, 20, which computer unit is integrated, for example, in the operator display 13, 23 of the weighing scale as an all-in-one computer, the fourth control module 51*d* receives information 132, 232 about whether an operator is currently logged into the weighing scale for the purpose of serviced sales. If an operator has logged in, the fourth control module 51*d* causes the fourth state machine 52*d* to transition to the first state 52*d*1. If the fourth control module 51*d* receives from the weighing scale 10, 20 the information 132, 232 that the operator has completed the operating process and the weighing scale is thus free again for other operators, the fourth control module 51*d* causes the fourth state machine 52*d* to transition to the second state 52*d*2.

If, during operation, the load cell 30 is loaded with objects that go beyond the maximum permitted weight of the load cell 30, this constitutes an overloading situation. In this case, the load cell 30 issues a corresponding alert signal. From the load cell 30, the fifth control module 51*e* receives an alert signal representing an overload situation and causes the fifth state machine 52*e* to transition to the first state 52*e*1. If the fifth control module 51*e* no longer receives an overload signal from the load cell 30, the fifth control module 51*e* causes the fifth state machine 52*e* to transition to the second state 52*d*2.

From a computer unit of the weighing scale 10, 20, which computer unit is integrated, for example, in the operator display 13, 23 of the weighing scale as an all-in-one computer, the sixth control module 51*f* receives a threshold value 135, 235 regarding how many weighings an operator has to perform per unit of time. The sixth control module 51*f* also continuously receives the weighings from the load cell 30. From this, the sixth control module calculates whether the operator has reached the required number of weighings per unit of time. The sixth control module 51*f* moves the sixth state machine 52*f* into the first state 52*f*1 if the threshold value 135, 235 has not been reached. The sixth control module 51*f* moves the sixth state machine 52*f* into the second state 52*f*2 if the threshold value 135, 235 is reached or exceeded.

The seventh control module receives a target weight from an input apparatus of the weighing scale 10, 20, for example the operator display 13, 23. Alternatively, the seventh control module receives a target number of products and a specific weight per product from an input device 13, 23 of the weighing scale 10, 20. The seventh control module calculates a target weight from the target number of items and the specific weight per product. In the process, the seventh control module may determine, from the target weight, a weight range including tolerances, in which case the overall weight range is deemed the target weight. The seventh control module and the data received by the seventh control module, for example the target weight, target number of items, or specific weight per product. A representation thereof would be similar to that of the first control module 51*a*. In addition, the seventh control module receives weight values ascertained by the load cell 30. If a weight value ascertained by the load cell 30 matches the target weight, the seventh state machine 52*f* switches to or remains in a second state 52*f*2. If the weight ascertained by the load cell 30 is below the target weight, the seventh state machine 52*f* switches to or remains in the first state 52*f*1. If the weight ascertained by the load cell 30 is above the target weight, the seventh state machine 52*f* switches to or remains in the third state 52*f*3.

The control device 51 comprises controllers 53, 54, which actuate and supply voltage to the strip light 19, 29. In this case, it has to be decided in advance which of the state machines 52*a*, 52*b*, 52*c*, 52*d*, 52*e*, 52*f* supplies an input signal to the controller at any point in time and which controller 53, 54 actuates the strip light 19, 29. The strip light 19, 29 may depict the state of only one state machine at any point in time. This selection is to be made by the operator on the operator display 13, 23. The first to sixth state machines 52*a*, 52*b*, 52*c*, 52*d*, 52*e*, 52*f* are connected to the first controller 53. The seventh state machine is connected to the second controller 54.

In the event that the strip light 19, 29 is a strip light 19, 29 having lamps 43 in the wavelength range from 230 nm to 500 nm (monochromatic strip light), the following applies:

If the first controller 53 actuates the strip light 19, 29 and the selected state machine 52*a*, 52*b*, 52*c*, 52*d*, 52*e*, 52*f* is in a first state 52*a*1, 52*b*1, 52*c*1, 52*d*1, 52*e*1, 52*f*1, the controller 53*a* applies a pulsed voltage to the strip light. The strip light 19, 29 flashes. If the selected state machine 52*a*, 52*b*, 52*c*, 52*d*, 52*e*, 52*f* is in a second state 52*a*2, 52*b*2, 52*c*2, 52*d*2, 52*e*2, 52*f*2, the controller 53*b* applies a constant voltage to the strip light. The strip light 19, 29 lights up.

If the second controller 54 actuates the strip light 19, 29 and the seventh state machine is in a first state 52g1, the controller 54a applies a pulsed voltage of a first frequency to the strip light. The strip light 19, 29 flashes slowly. If the seventh state machine is in a third state 52g3, the controller 54c applies a pulsed voltage of a second frequency to the strip light. The strip light 19, 29 flashes quickly. If the seventh state machine 52g is in a second state 52g2, the controller 54b applies a constant voltage to the strip light. The strip light 19, 29 lights up.

In the event that the strip light 19, 29 is a strip light 19, 29 comprising a group of second LED lamps 43 having a wavelength range from 500 nm to 570 nm (green light) and a group of third LED lamps 43 having a wavelength range from 610 nm to 760 nm (red light), the following applies:

If the first controller 53 actuates the strip light 19, 29 and the selected state machine 52a, 52b, 52c, 52d, 52e, 52f is in a first state 52a1, 52b1, 52c1, 52d1, 52e1, 52f1, the controller 53a applies a constant voltage to the group of third LED lamps 43 of the strip light. The strip light 19, 29 lights up in red. If the selected state machine 52a, 52b, 52c, 52d, 52e, 52f is in a second state 52a2, 52b2, 52c2, 52d2, 52e2, 52f2, the controller 53b applies a constant voltage to the group of second LED lamps 43 of the strip light. The strip light 19, 29 lights up in green.

If the second controller 54 actuates the strip light 19, 29 and the seventh state machine is in a first state 52f1, the controller 54a applies a constant voltage to the group of second LED lamps 43 and to the group of third LED lamps 43 of the strip light. The strip light 19, 29 lights up in yellow. If the seventh state machine is in a third state 52f3, the controller 54c applies a constant voltage to the group of third LED lamps 43 of the strip light. The strip light 19, 29 lights up in red. If the seventh state machine 52f is in a second state 52f2, the controller 53b applies a constant voltage to the group of second LED lamps 43 of the strip light. The strip light 19, 29 lights up in green.

The functions of various elements shown in the drawings, including the functional blocks, may be implemented by dedicated hardware or by generic hardware capable of executing software, in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and non-volatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A weighing scale, the weighing scale comprising:
    a weighing module, the weighing module comprising a housing in which a load cell is accommodated, the load cell comprising a fixed portion, a deformation portion, and a movable portion, the fixed portion being connected to the housing, and the movable portion bearing a spider having a platter, the deformation portion having a strain gauge for measuring a weight acting on the platter;
    a strip light attached to an external wall of the housing and attached substantially all around the housing; and
    a controller comprising a state machine which is configured to depict at least one technical state of the weighing scale, the controller being configured to actuate the strip light on the basis of a state of the state machine,
    wherein the controller is configured to:
        apply a voltage to the strip light in a pulsed manner in a condition where the state machine is in a first state, and apply a voltage to the strip light constantly in a condition where the state machine is in a second state, or
        apply a voltage to a third group of LED lamps of the strip light constantly in the condition where the state machine is in the first state, and apply a voltage to a second group of LED lamps of the strip light constantly in the condition where the state machine is in the second state,
    wherein the weighing scale further comprises a printer, which is configured to unroll paper from a continuous reel using a motor-driven printing roller and the printer is configured to feed the paper to a print head for direct thermal printing,
    wherein the printer comprises a sensor that is configured to determine a length of consumed paper,
    wherein the controller is configured to generate a difference from a paper length originally available on the continuous reel minus the length of paper consumed since the last paper reel change, and
        wherein the state machine is configured to remain in the second state as long as the difference is greater than a threshold value, and the state machine is configured to switch into the first state in a condition where the difference is less than the threshold value.

2. The weighing scale according to claim 1,
    wherein a target weight is stored in a memory in the controller, and
    wherein the state machine is in the second state in a condition where a weight value measured by the load cell matches the target weight, and the state machine is in the first state in a condition where the weight value measured by the load cell differs from the target weight.

3. The weighing scale according to claim 2, wherein a target number of items and an average weight per item are stored in a memory in the controller, and the controller is configured to calculate the target weight by multiplying the target number of items by the average weight per item.

4. The weighing scale according to claim 2,
wherein the state machine is configured to be in the first state in a condition where the weight value measured by the load cell is below the target weight, and
wherein the state machine is configured to be in a third state in a condition where the weight value measured by the load cell is above the target weight, and
wherein the controller is configured to apply the voltage to the strip light in the pulsed manner at a first frequency in the condition where the state machine is in the first state,
wherein the controller is configured to apply the voltage to the strip light in the pulsed manner at a second frequency in a condition where the state machine is in the third state, and
wherein the first frequency and the second frequency are different.

5. The weighing scale according to claim 4, wherein the second frequency is higher than the first frequency.

6. The weighing scale according to claim 2,
wherein the state machine is in the first state in a condition where the weight value measured by the load cell is below the target weight,
wherein the state machine is in a third state when the weight value measured by the load cell is above the target weight,
the strip light comprises second LED lamps which are configured to generate light in a wavelength range from 500 nm to 570 nm,
wherein the strip light comprises third LED lamps which are configured to generate light in a wavelength range from 610 nm to 760 nm,
wherein the second LED lamps and the third LED lamps are arranged in regular arrangements on the strip light, the second and third LED lamps being configured to be actuated and subjected to voltage by the controller jointly in respective groups,
wherein the controller is configured to apply the voltage to the second LED lamps of the strip light constantly in the condition where the state machine is in the second state,
wherein the controller is configured to apply the voltage to both the second LED lamps and the third LED lamps of the strip light constantly in the condition where the state machine is in the first state, and
wherein the controller is configured to apply the voltage to the third LED lamps of the strip light constantly in a condition where the state machine is in the third state.

7. The weighing scale according to claim 6, wherein the strip light is coated with silicone on the side on which the LED lamps are attached.

8. The weighing scale according to claim 1,
wherein the controller comprises a receiver which is configured to receive data from a computer unit, and
wherein the state machine of the controller is configured to transition from the second state to the first state in a condition where the receiver receives a signal from the computer unit indicating that a software update is required.

9. The weighing scale according to claim 1,
wherein the controller comprises a receiver, which is configured to receive data from a computer unit,
wherein the state machine of the controller is configured to transition from the second state to the first state in a condition where the receiver receives a signal from the computer unit indicating that an operator has logged into the computer unit using their operator ID for a purpose of serviced sales, and
wherein the state machine of the controller is configured to transition from the first state to the second state in a condition where the receiver receives a signal from the computer unit indicating that the operator has logged out of the computer unit using their operator ID.

10. The weighing scale according to claim 1, wherein the state machine of the controller is configured to change from the second state to the first state in a condition where the weight value measured by the load cell shows that the load cell is overloaded.

11. The weighing scale according to claim 1, wherein the state machine of the controller is configured to be in the second state in a condition where the number of weighing operations performed by the load cell per unit of time is above a threshold value stored in the controller, and the state machine of the controller is configured to be in a first state in a condition where the number of weighing operations performed by the load cell per unit of time is below the threshold value.

12. The weighing scale according to claim 1, wherein the LED lamps generate light in the wavelength range from 230 nm to 500 nm and are coated with phosphorus, the strip light being coated with phosphorus on a side on which the LED lamps are attached.

13. The weighing scale according to claim 1, wherein the strip light comprises a flexible substrate on which the LED lamps are arranged, wherein the substrate comprises one to ten LED lamps per cm of length.

14. The weighing scale according to claim 1, wherein the housing comprises a recess or a single-sided recess, which is made all around an outside of the housing in an upper housing region and into which the strip light is glued, the weighing scale further comprising a diffuser that is attached to the outside of the housing and covers the recess.

15. A weighing scale, the weighing scale comprising:
a weighing module, the weighing module comprising a housing in which a load cell is accommodated, the load cell comprising a fixed portion, a deformation portion, and a movable portion, the fixed portion being connected to the housing, and the movable portion bearing a spider having a platter, the deformation portion having a strain gauge for measuring a weight acting on the platter;
a strip light attached to an external wall of the housing and attached substantially all around the housing; and
a controller comprising a state machine which is configured to depict at least one technical state of the weighing scale, the controller being configured to actuate the strip light on the basis of a state of the state machine,
wherein the controller is configured to:
apply a voltage to the strip light in a pulsed manner in a condition where the state machine is in a first state, and apply a voltage to the strip light constantly in a condition where the state machine is in a second state, or
apply a voltage to a third group of LED lamps of the strip light constantly in the condition where the state machine is in the first state, and apply a voltage to a second group of LED lamps of the strip light constantly in the condition where the state machine is in the second state,
wherein the controller comprises a receiver which is configured to receive data from a computer unit, and wherein the state machine of the controller is configured to transition from the second state to the first state in a condition where the receiver receives a signal from the computer unit indicating that a software update is required.

16. A weighing scale, the weighing scale comprising:
a weighing module, the weighing module comprising a housing in which a load cell is accommodated, the load cell comprising a fixed portion, a deformation portion, and a movable portion, the fixed portion being connected to the housing, and the movable portion bearing a spider having a platter, the deformation portion having a strain gauge for measuring a weight acting on the platter;
a strip light attached to an external wall of the housing and attached substantially all around the housing; and
a controller comprising a state machine which is configured to depict at least one technical state of the weighing scale, the controller being configured to actuate the strip light on the basis of a state of the state machine,
wherein the controller is configured to:
apply a voltage to the strip light in a pulsed manner in a condition where the state machine is in a first state, and apply a voltage to the strip light constantly in a condition where the state machine is in a second state, or
apply a voltage to a third group of LED lamps of the strip light constantly in the condition where the state machine is in the first state, and apply a voltage to a second group of LED lamps of the strip light constantly in the condition where the state machine is in the second state,
wherein the controller comprises a receiver, which is configured to receive data from a computer unit,
wherein the state machine of the controller is configured to transition from the second state to the first state in a condition where the receiver receives a signal from the computer unit indicating that an operator has logged into the computer unit using their operator ID for a purpose of serviced sales, and
wherein the state machine of the controller is configured to transition from the first state to the second state in a condition where the receiver receives a signal from the computer unit indicating that the operator has logged out of the computer unit using their operator ID.

17. A weighing scale, the weighing scale comprising:
a weighing module, the weighing module comprising a housing in which a load cell is accommodated, the load cell comprising a fixed portion, a deformation portion, and a movable portion, the fixed portion being connected to the housing, and the movable portion bearing a spider having a platter, the deformation portion having a strain gauge for measuring a weight acting on the platter;
a strip light attached to an external wall of the housing and attached substantially all around the housing; and
a controller comprising a state machine which is configured to depict at least one technical state of the weighing scale, the controller being configured to actuate the strip light on the basis of a state of the state machine,
wherein the controller is configured to:
apply a voltage to the strip light in a pulsed manner in a condition where the state machine is in a first state, and apply a voltage to the strip light constantly in a condition where the state machine is in a second state, or
apply a voltage to a third group of LED lamps of the strip light constantly in the condition where the state machine is in the first state, and apply a voltage to a second group of LED lamps of the strip light constantly in the condition where the state machine is in the second state,
wherein the state machine of the controller is configured to be in the second state in a condition where the number of weighing operations performed by the load cell per unit of time is above a threshold value stored in the controller, and the state machine of the controller is configured to be in a first state in a condition where the number of weighing operations performed by the load cell per unit of time is below the threshold value.

* * * * *